United States Patent
Surana et al.

(10) Patent No.: US 12,549,612 B2
(45) Date of Patent: *Feb. 10, 2026

(54) IDENTIFYING AN ACTIVE ADMINISTRATION FUNCTION (ADMF) IN A LAWFUL INTERCEPTION DEPLOYMENT THAT UTILIZES A PLURALITY OF ADMFs

(71) Applicant: Microsoft Technology Licensing, LLC, Redmond, WA (US)

(72) Inventors: Neeraj Surana, Bengaluru (IN); Kantha Rao Dammalapati, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/492,347

(22) Filed: Oct. 23, 2023

(65) Prior Publication Data
US 2024/0048598 A1 Feb. 8, 2024

Related U.S. Application Data

(63) Continuation of application No. 17/349,278, filed on Jun. 16, 2021, now Pat. No. 11,799,918.

(51) Int. Cl.
*H04L 29/00* (2006.01)
*H04L 9/40* (2022.01)
*H04L 67/147* (2022.01)

(52) U.S. Cl.
CPC ........ *H04L 63/306* (2013.01); *H04L 63/0414* (2013.01); *H04L 63/20* (2013.01); *H04L 67/147* (2013.01)

(58) Field of Classification Search
CPC ... H04L 63/306; H04L 63/0414; H04L 63/20; H04L 67/147

(Continued)

(56) References Cited

U.S. PATENT DOCUMENTS 10,230,769 B2 * 3/2019 Zhang .................... H04L 63/30
2009/0259741 A1 10/2009 Shen et al.

FOREIGN PATENT DOCUMENTS

EP 2569708 B1 * 5/2018 ....... G06F 17/30902

OTHER PUBLICATIONS

Communication under Rule 71(3) Received in European Patent Application No. 22727619.3, mailed on Jan. 17, 2025, 07 pages.

(Continued)

*Primary Examiner* — Brandon Hoffman
*Assistant Examiner* — Michael D Anderson
(74) *Attorney, Agent, or Firm* — Ray Quinney & Nebeker P.C.; James S. Bullough

(57) ABSTRACT

A method for identifying an active administration function (ADMF) in a lawful interception deployment that utilizes an ADMF set comprising a plurality of ADMFs can be implemented by a network element. The method can include exchanging lawful interception signaling with a first ADMF when the first ADMF is the active ADMF. The method can also include receiving an auditing request message from one of the plurality of ADMFs in the ADMF set and sending a ping request message to each ADMF in the ADMF set. The method can also include receiving a ping response message from a second ADMF among the plurality of ADMFs in the ADMF set and identifying the second ADMF as the active ADMF in response to receiving the ping response message. The method can also include exchanging second lawful interception signaling with the second ADMF when the second ADMF is the active ADMF.

18 Claims, 8 Drawing Sheets

(58) Field of Classification Search
USPC .............................................................. 726/1
See application file for complete search history.

(56) References Cited

OTHER PUBLICATIONS

Decision to grant a European patent pursuant to Article 97(1) Received in European Patent Application No. 22727619.3, mailed on Apr. 10, 2025, 02 pages.

* cited by examiner

IDENTIFYING AN ACTIVE ADMINISTRATION FUNCTION (ADMF) IN A LAWFUL INTERCEPTION DEPLOYMENT THAT UTILIZES A PLURALITY OF ADMFs

CROSS-REFERENCE TO RELATED APPLICATIONS

This application is a Continuation of U.S. application Ser. No. 17/349,278, filed on Jun. 16, 2021, the entirety of which is incorporated herein by reference.

BACKGROUND

Lawful interception refers to the facilities in telecommunications and telephone networks that allow law enforcement agencies with court orders or other legal authorization to obtain communications network data for the purpose of analysis or evidence.

In the context of lawful interception, the term "task" can refer to an instance of interception at a network element carried out against a set of target identifiers. A task can start from an activate command and end with a deactivate command. Carrying out a task can result in certain information being obtained. The term "destination" can refer to a point where interception-related information can be delivered by a network element.

The term "network element" can refer generally to any component of a communication service provider's network that is provided with, or intended to be provided with, information related to lawful interception. Under some circumstances, a network element can be a network function. Alternatively, a network element can be another type of network element besides a network function.

The term "administration function" can refer to any entity that provides one or more administrative functions for lawful interception capability. An administration function (ADMF) can be configured to ensure that an intercept request from a law enforcement agency is provisioned for collection from a communication service provider's network, and that the information that is collected is delivered to a law enforcement monitoring facility.

Some aspects of lawful interception can involve communication between an ADMF and one or more network elements. Some communications between an ADMF and a network element can be related to the ADMF's provisioning of the network elements to perform interception. For example, an ADMF can add a new task to a network element, modify an existing task on the network element, deactivate a task on a network element, add a new destination to a network element, modify an existing destination on the network element, remove a destination from the network element, get information about a task and/or a destination on the network element, get information about the status of the network element, and so forth. A network element can report issues to the ADMF about tasks, destinations, and/or the network element itself.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

One aspect of the present disclosure is directed to a method for identifying an active administration function (ADMF) in a lawful interception deployment that utilizes an ADMF set comprising a plurality of ADMFs. The method is implemented by a network element. The method comprises identifying a first ADMF among the plurality of ADMFs in the ADMF set as the active ADMF. At any given point in time only one ADMF among the plurality of ADMFs is identified as the active ADMF. The method also comprises exchanging first lawful interception signaling with the first ADMF when the first ADMF is the active ADMF. The method also comprises receiving an auditing request message from one of the plurality of ADMFs in the ADMF set. The auditing request message does not identify a specific ADMF in the ADMF set as a sender of the auditing request message. The method also comprises sending a ping request message to each ADMF in the ADMF set. The method also comprises receiving a ping response message from a second ADMF among the plurality of ADMFs in the ADMF set. The method also comprises identifying the second ADMF as the active ADMF based at least in part on receiving the ping response message from the second ADMF. The method also comprises exchanging second lawful interception signaling with the second ADMF when the second ADMF is the active ADMF.

In some embodiments, the network element can receive the auditing request message from the second ADMF in response to the first ADMF becoming unavailable.

In some embodiments, the auditing request message can be received from the second ADMF in the ADMF set. The plurality of ADMFs in the ADMF set can be associated with a same ADMF identifier. The auditing request message can be structured so that the auditing request message comprises the ADMF identifier but does not comprise any other identifier that distinguishes the second ADMF from other ADMFs in the ADMF set.

In some embodiments, the plurality of ADMFs in the ADMF set can be associated with an ADMF identifier. Each ADMF in the ADMF set can also comprise an Internet protocol (IP) address. The method can further comprise configuring the network element with the ADMF identifier and the IP address of each ADMF in the ADMF set.

In some embodiments, the plurality of ADMFs in the ADMF set can be associated with an ADMF identifier. The method can further comprise sending an auditing response message that is addressed to the ADMF identifier.

In some embodiments, the auditing request message can comprise a GetAllDetails request message, and the auditing response message can comprise a GetAllDetails response message.

In some embodiments, the network element does not receive any other ping response messages from any other ADMFs among the plurality of ADMFs in response to sending the ping request message.

In some embodiments, the network element can be selected from the group consisting of a point of interception, a triggering function, a mediation and delivery function, and a system information retrieval function.

Another aspect of the present disclosure is directed to a method for enabling a network element to identify an active administration function (ADMF) in a lawful interception deployment that utilizes an ADMF set comprising a plurality of ADMFs. The method is implemented by an ADMF among the plurality of ADMFs in the ADMF set. The method comprises transitioning from a standby state into an active state in which the ADMF is the active ADMF. At any given point in time only one ADMF among the plurality of ADMFs in the ADMF set is the active ADMF. The method also comprises sending an auditing request message to the network element after transitioning into the active state. The method also comprises receiving a ping request message from the network element after sending the auditing request message to the network element. The method also comprises sending a ping response message to the network element in response to receiving the ping request message. The method also comprises exchanging lawful interception signaling with the network element when the ADMF is the active ADMF.

In some embodiments, the auditing request message can be sent to the network element in response to a prior active ADMF becoming unavailable.

In some embodiments, the plurality of ADMFs in the ADMF set can be associated with a same ADMF identifier. The auditing request message can be structured so that the auditing request message comprises the ADMF identifier but does not comprise any other identifier that distinguishes the ADMF from other ADMFs in the ADMF set.

In some embodiments, the plurality of ADMFs in the ADMF set can be associated with an ADMF identifier. The method can further comprise receiving an auditing response message that is addressed to the ADMF identifier.

In some embodiments, the auditing request message can comprise a GetAllDetails request message, and the auditing response message can comprise a GetAllDetails response message.

Another aspect of the present disclosure is directed to a system for identifying an active administration function (ADMF) in a lawful interception deployment that utilizes an ADMF set comprising a plurality of ADMFs. The system comprises one or more processors, memory in electronic communication with the one or more processors, and instructions stored in the memory. The instructions are executable by the one or more processors to cause a network element to identify a first ADMF among the plurality of ADMFs in the ADMF set as the active ADMF. At any given point in time only one ADMF among the plurality of ADMFs is identified as the active ADMF. The instructions are also executable by the one or more processors to cause the network element to exchange first lawful interception signaling with the first ADMF when the first ADMF is the active ADMF. The instructions are also executable by the one or more processors to cause the network element to receive an auditing request message from one of the plurality of ADMFs in the ADMF set. The auditing request message does not identify a specific ADMF in the ADMF set as a sender of the auditing request message. The instructions are also executable by the one or more processors to cause the network element to send a ping request message to each ADMF in the ADMF set. The instructions are also executable by the one or more processors to cause the network element to receive a ping response message from a second ADMF among the plurality of ADMFs in the ADMF set. The instructions are also executable by the one or more processors to cause the network element to identify the second ADMF as the active ADMF based at least in part on receiving the ping response message from the second ADMF. The instructions are also executable by the one or more processors to cause the network element to exchange second lawful interception signaling with the second ADMF when the second ADMF is the active ADMF.

In some embodiments, the network element can receive the auditing request message from the second ADMF in response to the first ADMF becoming unavailable.

In some embodiments, the auditing request message can be received from the second ADMF in the ADMF set. The plurality of ADMFs in the ADMF set can be associated with a same ADMF identifier. The auditing request message can be structured so that the auditing request message comprises the ADMF identifier but does not comprise any other identifier that distinguishes the second ADMF from other ADMFs in the ADMF set.

In some embodiments, the plurality of ADMFs in the ADMF set can be associated with an ADMF identifier. Each ADMF in the ADMF set can also comprise an Internet protocol (IP) address. The system can further comprise additional instructions that are executable by the one or more processors to configure the network element with the ADMF identifier and the IP address of each ADMF in the ADMF set.

In some embodiments, the plurality of ADMFs in the ADMF set can be associated with an ADMF identifier. The system can further comprise additional instructions that are executable by the one or more processors to cause the network element to send an auditing response message that is addressed to the ADMF identifier.

In some embodiments, the auditing request message can comprise a GetAllDetails request message, and the auditing response message can comprise a GetAllDetails response message.

In some embodiments, the network element does not receive any other ping response messages from any other ADMFs among the plurality of ADMFs in response to sending the ping request message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Some lawful interception deployments can include a plurality of ADMFs for redundancy or other purposes. A plurality of ADMFs that are deployed in this way can be referred to as a set of ADMFs. There are at least two possible ways that such deployments can be implemented. In a first possible implementation, a network element can present itself as a separate network element to each ADMF. However, in a second possible implementation, a network element can present itself as a single network element to each ADMF. In this second implementation, all of the ADMFs in the ADMF set can use the same ADMF identifier. The ADMF set can be configured so that only one ADMF in the ADMF set is in an active state at any given point in time, and other ADMFs in the ADMF set are in a standby state.

As discussed above, a network element can send messages (e.g., reports) to an ADMF. In lawful interception deployments that include an ADMF set implemented according to the second implementation described above, a network element can be configured to send messages to the active ADMF. However, because all of the ADMFs in the ADMF set use the same ADMF identifier, it can be difficult for a network element to determine which ADMF is the active ADMF. This problem can be particularly difficult when the active ADMF changes (e.g., the active ADMF becomes unavailable and another ADMF in the ADMF set becomes the new active ADMF).

The present disclosure is generally related to identifying the active ADMF in a lawful interception deployment. The techniques disclosed herein involve communication between a network element and an ADMF set comprising a plurality of ADMFs. All of the ADMFs in the ADMF set use the same ADMF identifier, and only one ADMF in the ADMF set can be in an active state at any given point in time. In accordance with the present disclosure, whenever an ADMF becomes the active ADMF, it sends an auditing request message (e.g., a GetAllDetails request message) to the network element. The auditing request message itself does not inform the network element which ADMF is the active ADMF. However, the auditing request message causes the network element to initiate a process that enables the network element to find out which ADMF is the active ADMF. In particular, when the network element receives the auditing request message, the network element sends a ping request message to each ADMF in the ADMF set. Only the active ADMF responds to the ping request message. Therefore, once the network element has received a response to the ping request message, the network element is able to identify the sender of the ping request message as the active ADMF.

Figure 1:
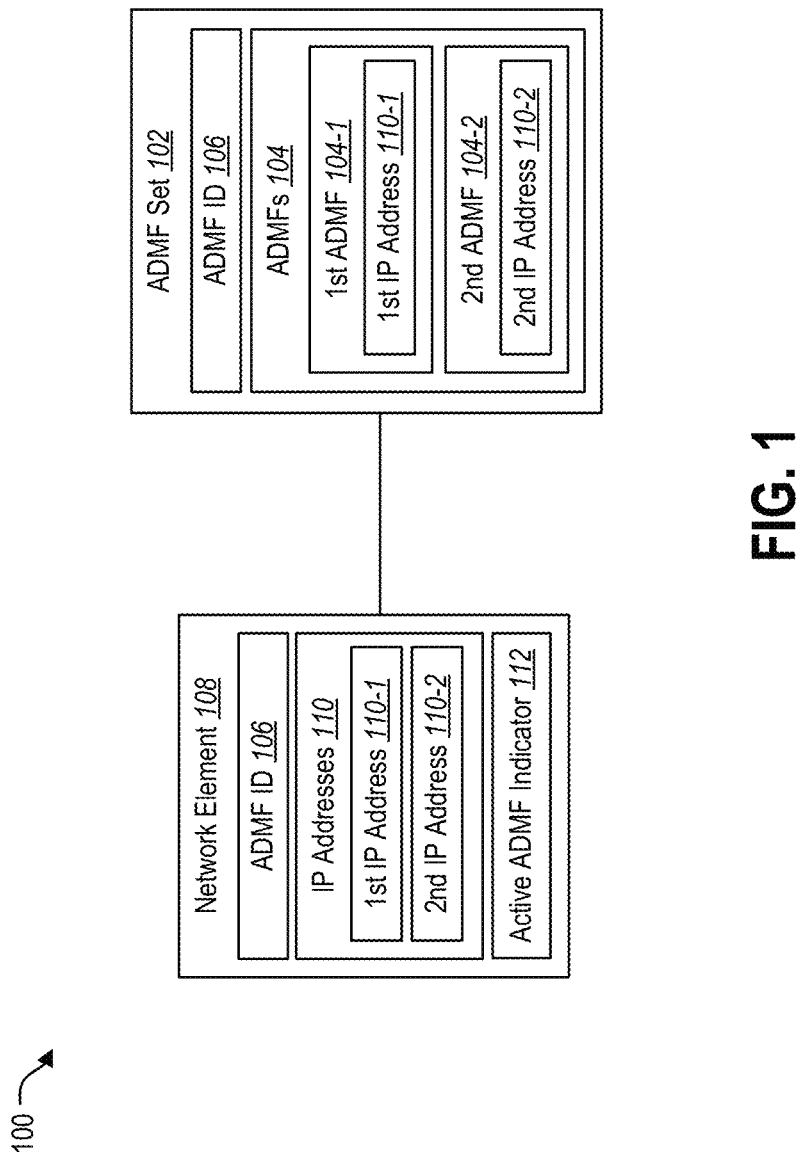
FIG. 1 illustrates an example of a system in which the techniques disclosed herein can be utilized.

FIG. 1 illustrates an example of a system 100 in which the techniques disclosed herein can be utilized. The system 100 includes an ADMF set 102. In the depicted example, the ADMF set 102 includes two ADMFs 104: a first ADMF 104-1 and a second ADMF 104-2. Of course, an ADMF set in accordance with the present disclosure can include more than two ADMFs.

The ADMF set 102 includes an ADMF ID 106. Each ADMF 104 in the ADMF set 102 has the same ADMF ID 106. In other words, the ADMF ID 106 is associated with both the first ADMF 104-1 and the second ADMF 104-2.

The ADMF set 102 can be configured so that only one ADMF 104 in the ADMF set 102 is permitted to be active at any given point in time. In other words, the ADMF set 102 can be configured so that only one of the ADMFs 104 in the ADMF set 102 is in an active state, and other ADMFs 104 in the ADMF set 102 are in a standby state. Thus, if the first ADMF 104-1 is in the active state, then the second ADMF 104-2 is in the standby state (or vice versa).

The system 100 also includes a network element 108 that is communicatively coupled to the active ADMF 104 in the ADMF set 102. Communication between the network element and the active ADMF 104 in the ADMF set 102 can occur in both directions. Examples of messages that the active ADMF 104 in the ADMF set 102 can send to the network element 108 will be described below. Examples of messages that the network element 108 can send to the active ADMF 104 in the ADMF set 102 will also be described below.

The network element 108 can be configured with certain information about the ADMF set 102. For example, the network element 108 can be configured with the ADMF ID 106. In addition, the network element 108 can be configured with the IP addresses 110 of each ADMF 104 in the ADMF set 102. In particular, the network element 108 can be configured with the IP address of the first ADMF 104-1 (which will be referred to as the first IP address 110-1) and the IP address of the second ADMF 104-2 (which will be referred to as the second IP address 110-2). The network element 108 can also include an indication of which ADMF 104 in the ADMF set 102 is the active ADMF 104. This indication may be referred to as an active ADMF indicator 112.

Figure 2A:
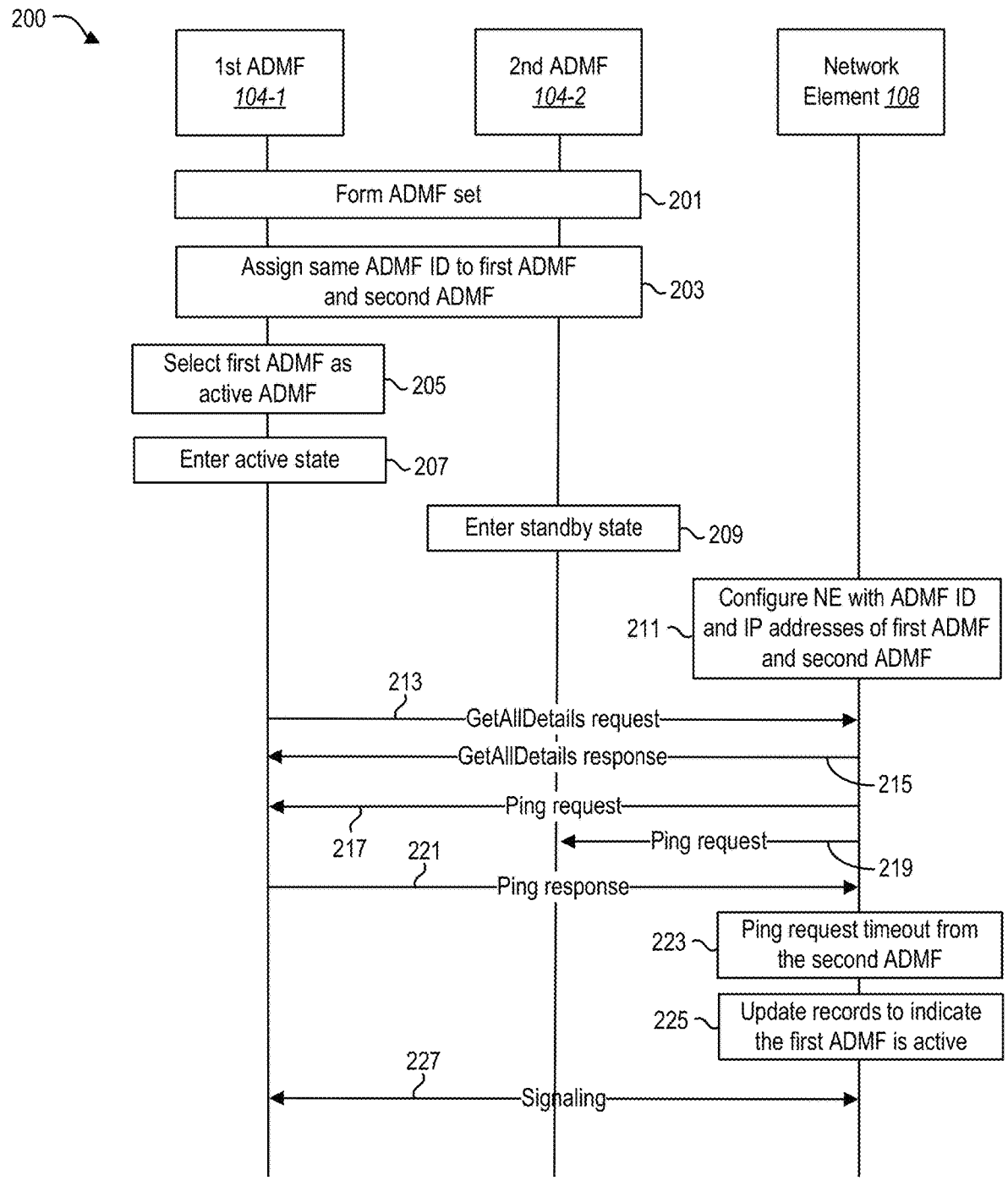
FIGS. 2A and 2B illustrate an example of a method for a network element to identify an active ADMF in a lawful interception deployment that utilizes an ADMF set comprising a plurality of ADMFs.
Figure 2B:
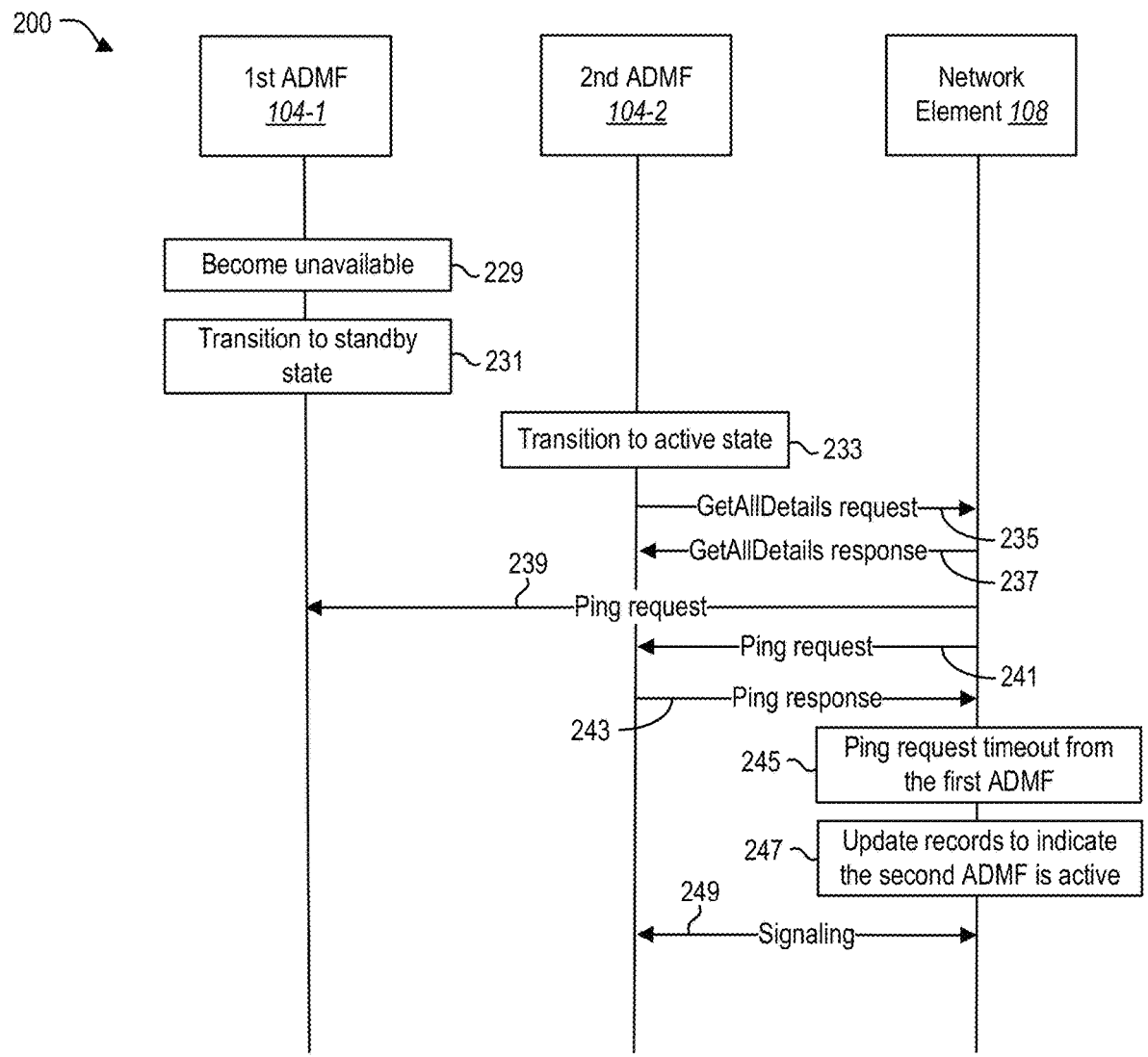

FIGS. 2A and 2B illustrate an example of a method 200 for a network element 108 to identify an active ADMF 104 in a lawful interception deployment that utilizes an ADMF set 102 comprising a plurality of ADMFs 104. The method 200 will be described in relation to the system 100 shown in FIG. 1. The entities that are involved in performing the method 200 include the first ADMF 104-1, the second ADMF 104-2, and the network element 108.

Reference is initially made to FIG. 2A. At 201, an ADMF set 102 is formed. The ADMF set 102 comprises the first ADMF 104-1 and the second ADMF 104-2. At 203, the first ADMF 104-1 and the second ADMF 104-2 are assigned the same ADMF ID 106. At 205, the first ADMF 104-1 is selected as the active ADMF 104. At 207, the first ADMF 104-1 enters the active state. At 209, the second ADMF 104-2 enters the standby state.

At 211, the network element 108 is configured with the ADMF ID 106 and the IP addresses 110 of the first ADMF 104-1 and the second ADMF 104-2.

The active ADMF can be configured so that it sends an auditing request message whenever a new network element is added. Thus, at 213, when the network element 108 is added, the first ADMF 104-1 sends an auditing request message to the network element 108. At 215, when the network element 108 receives the auditing request message, the network element 108 sends an auditing response message that is received by the first ADMF 104-1.

In this context, the term "auditing request message" can refer to a message that an ADMF 104 sends to a network element 108 to request information related to lawful interception from the network element 108. The term "auditing response message" can refer to a message that a network element 108 sends to an ADMF 104 in response to an auditing request message. In the depicted example, the auditing request message can take the form of a GetAllDetails request message, and the auditing response message can take the form of a GetAllDetails response message.

The GetAllDetails request message can include the ADMF ID 106. However, because the same ADMF ID 106 is associated with each ADMF 104 in the ADMF set 102, the network element 108 does not know from the GetAllDetails request message which ADMF 104 is the active ADMF 104.

To find out which ADMF 104 is the active ADMF 104, the network element 108 can send a ping request message to each ADMF 104 in the ADMF set 102. The network element 108 can send these ping request messages on receiving the GetAllDetails request message.

At 217, the network element 108 sends a first ping request message to the first ADMF 104-1. At 219, the network element 108 sends a second ping request message to the second ADMF 104-2. The first ping request message can be sent to the first IP address 110-1 (which, as noted above, corresponds to the first ADMF 104-1), and the second ping request message can be sent to the second IP address 110-2 (which, as noted above, corresponds to the second ADMF 104-2). The network element 108 is able to send these ping request messages because the network element 108 has been configured with the IP address 110 of each ADMF 104 in the ADMF set 102.

The ADMFs 104 in the ADMF set 102 can be configured so that only the active ADMF 104 responds to the ping request message sent by the network element 108. Therefore, in the present example, the first ADMF 104-1 responds to the ping request message sent by the network element 108. In particular, at 221, the first ADMF 104-1 sends a ping response message back to the network element 108. When the network element 108 receives the ping response message, the network element 108 is aware that the ping response message was sent by the first ADMF 104-1. In some embodiments, the network element 108 is aware that the ping response message was sent by the first ADMF 104-1 because both the ping request message and the ping response message are associated with the same logical connection (e.g., HTTP connection), and the logical connection is associated with the first ADMF 104-1. More specifically, a ping request message can be sent as an HTTP request over TCP. Each ping request message can be sent over a different connection. Therefore, when a response comes back, the network element is able to identify which ADMF has responded based on the connection through which the response is received.

In a cloud native environment, there may be multiple client IP addresses for the ADMF, and as a server it may have a different IP address than the client IP addresses. The network element can be configured to use the server IP address when it is initiating a request.

Because the second ADMF 104-2 is in a standby state and is not the active ADMF 104, the second ADMF 104-2 does not respond to the ping request message sent by the network element 108. At 223, the ping request message that the network element 108 sends to the second ADMF 104-2 times out.

At 225, after the network element 108 has received the ping response message from the first ADMF 104-1, the network element 108 updates its records to indicate that the first ADMF 104-1 is the active ADMF 104. For example, the network element 108 can update the active ADMF indicator 112 to reflect the fact that the first ADMF 104-1 is the active ADMF 104.

At 227, lawful interception signaling occurs between the network element 108 and the first ADMF 104-1. The lawful interception signaling can include one or more messages related to lawful interception that are sent from the first ADMF 104-1 to the network element 108. Alternatively, or in addition, the lawful interception signaling can include one or more messages related to lawful interception that are sent from the network element 108 to the first ADMF 104-1. Some examples of message(s) that can be exchanged as part of the lawful interception signaling will be described below.

Reference is now made to FIG. 2B. At 229, the first ADMF 104-1 becomes unavailable. There are several possible reasons why the first ADMF 104-1 could become unavailable. For example, the first ADMF 104-1 could become unavailable due to a hardware and/or software failure. As another example, a network operator could intentionally make the first ADMF 104-1 unavailable by taking the first ADMF 104-1 offline (e.g., in order to perform a maintenance operation).

At 231, when the first ADMF 104-1 becomes unavailable, the first ADMF 104-1 is transitioned from the active state to the standby state. At 233, when the first ADMF 104-1 becomes unavailable, the second ADMF 104-2 is transitioned from the standby state to the active state. Thus, the second ADMF 104-2 becomes the new active ADMF 104.

At 235, after the second ADMF 104-2 transitions from the standby state to the active state, the second ADMF 104-2 sends an auditing request message to the network element 108. At 235, the network element 108 receives the auditing request message. At 237, the network element 108 sends an auditing response message that is received by the second ADMF 104-2. As before, the auditing request message can be a GetAllDetails request message, and the auditing response message can be a GetAllDetails response message. The GetAllDetails request message can include the ADMF ID 106. However, because the same ADMF ID 106 is associated with each ADMF 104 in the ADMF set 102, the network element 108 does not know from the GetAllDetails request message which ADMF 104 is the active ADMF 104.

To find out which ADMF 104 is the active ADMF 104, the network element 108 can send a ping request message to each ADMF 104 in the ADMF set 102. Receiving the GetAllDetails request message can cause the network element 108 to send these ping request messages.

At 239, the network element 108 sends a first ping request message to the first ADMF 104-1. At 241, the network element 108 sends a second ping request message to the second ADMF 104-2. The first ping request message can be sent to the first IP address 110-1 (which, as noted above, corresponds to the first ADMF 104-1), and the second ping request message can be sent to the second IP address 110-2 (which, as noted above, corresponds to the second ADMF 104-2). The network element 108 is able to send these ping request messages because the network element 108 has been configured with the IP address 110 of each ADMF 104 in the ADMF set 102.

The ADMFs 104 in the ADMF set 102 can be configured so that only the active ADMF 104 responds to the ping request message sent by the network element 108. Therefore, in the present example, the second ADMF 104-2 responds to the ping request message sent by the network element 108. In particular, at 243, the second ADMF 104-2 sends a ping response message back to the network element 108. When the network element 108 receives the ping response message, the network element 108 is aware that the ping response message was sent by the second ADMF 104-2. In some embodiments, the network element 108 is aware that the ping response message was sent by the second ADMF 104-2 because both the ping request message and the ping response message are associated with the same logical connection (e.g., HTTP connection), and the logical connection is associated with the second ADMF 104-2.

Because the first ADMF 104-1 is no longer the active ADMF 104 (and also because the first ADMF 104-1 is no longer available), the first ADMF 104-1 does not respond to the ping request message sent by the network element 108. At 245, the ping request message that the network element 108 sends to the first ADMF 104-1 times out.

At 247, when the network element 108 receives the ping response message from the second ADMF 104-2, the network element 108 updates its records to indicate that the second ADMF 104-2 is the active ADMF 104. For example, the network element 108 can update the active ADMF indicator 112 to reflect the fact that the second ADMF 104-2 is now the active ADMF 104.

At 249, lawful interception signaling occurs between the network element 108 and the second ADMF 104-2. The lawful interception signaling can include one or more messages sent from the second ADMF 104-2 to the network element 108. Alternatively, or in addition, the lawful interception signaling can include one or more messages sent from the network element 108 to the second ADMF 104-2. Some examples of message(s) that can be exchanged as part of the lawful interception signaling will be described below.

Figure 3:
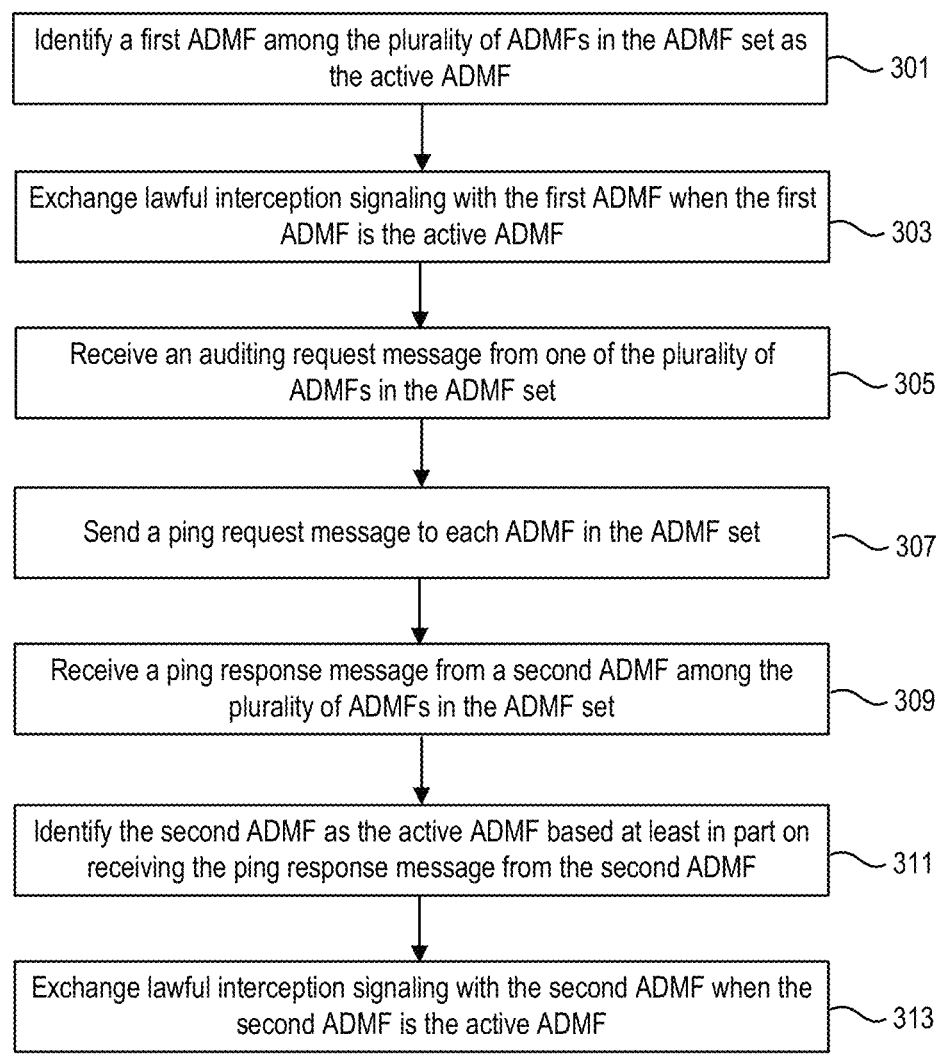
FIG. 3 illustrates an example of a method that can be performed by a network element to identify an active ADMF in a lawful interception deployment that utilizes an ADMF set comprising a plurality of ADMFs.

FIG. 3 illustrates an example of a method 300 for identifying an active ADMF 104 in a lawful interception deployment that utilizes an ADMF set 102 comprising a plurality of ADMFs 104. The method 300 will be described in relation to the system 100 shown in FIG. 1. The method 300 can be performed by a network element 108.

At 301, the network element 108 identifies a first ADMF 104-1 among the plurality of ADMFs 104 in the ADMF set 102 as the active ADMF 104. In some embodiments, a first ADMF 104-1 can send an auditing request message (e.g., a GetAllDetails request message) when the network element 108 is added. The auditing request message can cause the network element 108 to send a ping request message to each ADMF 104 in the ADMF set 102. The active ADMF 104 (which in this case is the first ADMF 104-1) is the only ADMF 104 in the ADMF set 102 that responds to the ping request message. Therefore, when the network element 108 receives the ping request message from the first ADMF 104-1, the network element 108 infers that the first ADMF 104-1 is the active ADMF 104.

At 303, the network element 108 exchanges lawful interception signaling with the first ADMF 104-1 when the first ADMF 104-1 is the active ADMF 104. Exchanging lawful interception signaling with the first ADMF 104-1 can include sending one or more lawful interception messages to the first ADMF 104-1. Alternatively, or in addition, exchanging lawful interception signaling with the first ADMF 104-1 can include receiving one or more lawful interception messages from the first ADMF 104-1.

At 305, the network element 108 receives an auditing request message from one of the plurality of ADMFs 104 in the ADMF set 102. The auditing request message does not identify a specific ADMF 104 in the ADMF set 102 as a sender of the auditing request message. Although the auditing request message includes the ADMF ID 106, the ADMF ID 106 does not inform the network element 108 which ADMF 104 is the active ADMF 104 because all of the ADMFs 104 in the ADMF set 102 use the same ADMF ID 106.

At 307, the network element 108 sends a ping request message to each ADMF 104 in the ADMF set 102. Receiving the auditing request message can cause the network element 108 to send these ping request messages. At 309, the network element 108 receives a ping response message from a second ADMF 104-2 among the plurality of ADMFs 104 in the ADMF set 102. Only the active ADMF 104 responds to the ping request message. Therefore, once the network element 108 has received a response to the ping request message, the network element 108 is able to identify the sender of the ping response message as the active ADMF 104. At 311, the network element 108 identifies the second ADMF 104-2 as the active ADMF 104 based on receiving the ping response message from the second ADMF 104-2.

At 313, the network element 108 exchanges lawful interception signaling with the second ADMF 104-2 when the second ADMF 104-2 is the active ADMF 104.

Exchanging lawful interception signaling with the second ADMF 104-2 can include sending one or more lawful interception messages to the second ADMF 104-2. Alternatively, or in addition, exchanging lawful interception signaling with the second ADMF 104-2 can include receiving one or more lawful interception messages from the second ADMF 104-2.

Figure 4:
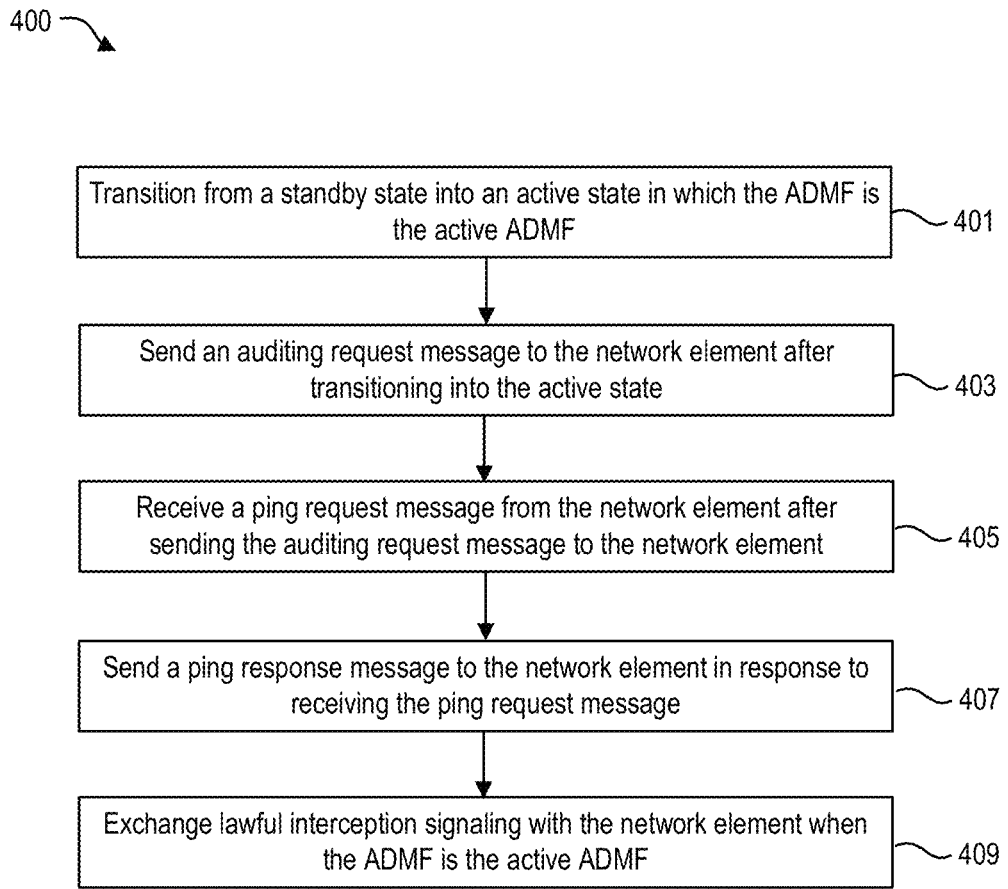
FIG. 4 illustrates an example of a method that can be performed by an ADMF to enable a network element to identify an active ADMF in a lawful interception deployment that utilizes an ADMF set comprising a plurality of ADMFs.

FIG. 4 illustrates an example of a method 400 for enabling a network element 108 to identify an active ADMF 104 in a lawful interception deployment that utilizes an ADMF set 102 comprising a plurality of ADMFs 104. The method 400 will be described in relation to the system 100 shown in FIG. 1. The method 400 can be performed by an ADMF 104 among the plurality of ADMFs 104 in the ADMF set 102. In the discussion that follows, it will be assumed that the method 400 is being performed by the second ADMF 104-2 in the ADMF set 102.

At 401, the second ADMF 104-2 transitions from a standby state into an active state in which the second ADMF 104-2 is the active ADMF 104. At any given point in time only one ADMF 104 among the plurality of ADMFs 104 in the ADMF set 102 is the active ADMF 104. Thus, by transitioning into the active state, the second ADMF 104-2 becomes the only active ADMF 104 in the ADMF set 102.

The ADMF set 102 can be configured so that whenever an ADMF 104 transitions into the active state, the ADMF 104 sends an auditing request message to the network element 108. Thus, at 403, the second ADMF 104-2 sends an auditing request message to the network element 108 in response to transitioning into the active state. In some embodiments, the auditing request message can take the form of a GetAllDetails request message.

The auditing request message does not specifically identify the second ADMF 104-2. Although the auditing request message can include the ADMF ID 106, the same ADMF ID 106 is associated with each ADMF 104 in the ADMF set 102. Therefore, the ADMF ID 106 does not inform the network element 108 which ADMF 104 sent the auditing request message. To find out which ADMF 104 is the active ADMF 104, the network element 108 sends a ping request message to each ADMF 104 in the ADMF set 102. Thus, at 403, the second ADMF 104-2 receives a ping request message from the network element 108. The auditing request message that the second ADMF 104-2 sends to the network element 108 triggers the ping request message from the network element 108.

At 407, the second ADMF 104-2 sends a ping response message to the network element 108 in response to receiving the ping request message. The second ADMF 104-2 is the only ADMF 104 in the ADMF set 102 that responds to the ping request message. This informs the network element 108 that the second ADMF 104-2 is now the active ADMF 104, and the network element 108 can update its records accordingly.

At 409, the second ADMF 104-2 exchanges lawful interception signaling with the network element 108 when the second ADMF 104-2 is the active ADMF 104. Exchanging lawful interception signaling with the network element 108 can include sending one or more lawful interception messages to the network element 108. Alternatively, or in addition, exchanging lawful interception signaling with the network element 108 can include receiving one or more lawful interception messages from the network element 108.

To ensure systematic procedures for carrying out lawful interception procedures, while also lowering the costs of lawful interception solutions, industry groups and government agencies worldwide have attempted to standardize the technical processes behind lawful interception. One organization that is involved with such standardizing is the European Telecommunications Standards Institute (ETSI). ETSI is a standardization organization that is officially recognized by the European Union as a European Standards Organization (ESO). ETSI is responsible for the standardization of information and communication technologies (ICT). ETSI supports the development and testing of global technical standards for ICT-enabled systems, applications and services.

In some embodiments, the techniques disclosed herein can be utilized in a lawful interception deployment that is configured in accordance with ETSI TS 103 221-1. ETSI TS 103 221-1 defines an electronic interface for the exchange of information relating to the establishment and management of lawful interception. The interface defined in ETSI TS 103 221-1 can be used between a central lawful interception ADMF and the network's internal interception points. Typical reference models for lawful interception define (a) an interface between law enforcement agencies (LEAs) and communication service providers (CSPs), and (b) an internal network interface within the CSP domain between administration and mediation functions for lawful interception and network internal functions, which facilitates the interception of communication. Interface (b) can include three sub-interfaces: administration (called X1), transmission of intercept related information (X2), and transmission of content of communication (X3). ETSI TS 103 221-1 specifies the administration interface X1.

The X1 interface can be based on communication between two entities: a controlling function (e.g., a CSP ADMF) and a controlled function (e.g., a network element or network function). A CSP ADMF can use the X1 interface to provision one or more network elements to perform interception.

An X1 transaction can include a request followed by a response. A request can be sent in either direction. In other words, either the ADMF or the network element can initiate the request. The side initiating the request may be referred to as the requester. The other side (which receives and responds to the request) may be referred to as the responder. An ADMF can send a request in order to distribute information and/or request status from a network element. A network element can send a request in order to deliver fault reports or other information.

A task on the X1 interface can be uniquely identified by an X1 identifier (XID). A task can be handled independently of all other tasks. An XID can be assigned as a universally unique identifier (UUID). An XID for a particular task can be released once the task has ended.

Intercepted traffic can be delivered by a network element to a destination. A destination can be uniquely identified by a destination identifier (DID), and can be handled independently from details of the task. A task can be associated with one or more destinations.

Warnings can be sent in response to problems that are not affecting traffic (e.g., causing intercept-related information to be lost). For example, warnings can be related to resources being nearly exhausted but not yet affecting traffic. Warnings can be sent by the network element and then not referred to again over the X1 interface. Warnings can be reported using issue-reporting messages. A lawful interception deployment can be configured so that warnings are not included in any future status-getting messages. A network element can log any warnings for audit reasons.

Faults can be related to problems that a network element should try to manage and/or rectify. Any issue that causes traffic to be lost can be categorized as a fault. A network element can remember which of the XIDs are in fault and whether the network element itself is in a fault situation. An issue report can be sent at the start of a fault. A network element can report faults when responding to a status-getting message. A network element can also indicate when a fault has been cleared.

Messages sent via the X1 interface can include the following information: an ADMF ID that identifies the ADMF to the network element, a network element identifier that identifies the network element to the ADMF, a message timestamp indicating the time the message was sent by the requester, a version identifier indicating the version of ETSI TS 103 221-1 that was used for encoding the message, and an X1 transaction identifier that is used to correlate a request and a response. In addition to the information just described, a request message sent via the X1 interface can indicate the type of request being made and contain the appropriate request parameters for that type of request.

ETSI TS 103 221-1 defines several different types of messages that can be sent via the X1 interface. Some messages can be sent from the ADMF to the network element. Examples of such messages include an ActivateTask message, a ModifyTask message, a DeactivateTask message, a DeactivateAllTasks message, a CreateDestination message, a ModifyDestination message, a RemoveDestination message, a RemoveAllDestinations message, a GetTaskDetails message, a GetDestinationDetails message, a GetNEStatus message, a GetAllDetails message, and a ListAllDetails message. Some messages can be sent from the network element to the ADMF. Examples of such messages include a ReportTaskIssue message, a ReportDestinationIssue message, and a ReportNEIssue message. Any of these messages can be exchanged as part of the lawful interception signaling that occurs at 215 and 237 in the method 200 shown in FIGS. 2A and 2B, at 303 and 313 in the method 300 shown in FIG. 3, and at 409 in the method 400 shown in FIG. 4.

An ActivateTask message can be sent from the ADMF to the network element. An ActivateTask message can be used by the ADMF to add a new task to a network element. In some embodiments, an ActivateTask message can be defined in accordance with section 6.2.1 of ETSI TS 103 221-1 version 1.7.1.

A ModifyTask message can be sent from the ADMF to the network element. A ModifyTask message can be used by the ADMF to modify an existing task on the network element. In some embodiments, a ModifyTask message can be defined in accordance with section 6.2.2 of ETSI TS 103 221-1 version 1.7.1.

A DeactivateTask message can be sent from the ADMF to the network element. A DeactivateTask message can be used by the ADMF to deactivate (e.g., permanently stop and remove) an existing task on the network element. In some embodiments, a DeactivateTask message can be defined in accordance with section 6.2.3 of ETSI TS 103 221-1 version 1.7.1.

A DeactivateAllTasks message can be sent from the ADMF to the network element. When an ADMF sends a DeactivateAllTasks message to a network element, this can cause the network element to deactivate (e.g., permanently stop and remove) all existing tasks on the network element. In some embodiments, a DeactivateAllTasks message can be defined in accordance with section 6.2.4 of ETSI TS 103 221-1 version 1.7.1.

A CreateDestination message can be sent from the ADMF to the network element. A CreateDestination message can be used by the ADMF to add a new destination to the network element. In some embodiments, a CreateDestination message can be defined in accordance with section 6.3.1 of ETSI TS 103 221-1 version 1.7.1.

A ModifyDestination message can be sent from the ADMF to the network element. A ModifyDestination message can be used by the ADMF to modify an existing destination on the network element. In some embodiments, a ModifyDestination message can be defined in accordance with section 6.3.2 of ETSI TS 103 221-1 version 1.7.1.

A RemoveDestination message can be sent from the ADMF to the network element. A RemoveDestination message can be used by the ADMF to remove a destination from the network element. In some embodiments, a RemoveDestination message can be defined in accordance with section 6.3.3 of ETSI TS 103 221-1 version 1.7.1.

A RemoveAllDestinations message can be sent from the ADMF to the network element. When an ADMF sends a RemoveAllDestinations message to a network element, this can cause the network element to completely and permanently remove all destinations on the network element. In some embodiments, a RemoveAllDestinations message can be defined in accordance with section 6.3.4 of ETSI TS 103 221-1 version 1.7.1.

A GetTaskDetails message can be sent from the ADMF to the network element. A GetTaskDetails message can be used by the ADMF to retrieve the details of a particular task. In some embodiments, a GetTaskDetails message can be defined in accordance with section 6.4.2 of ETSI TS 103 221-1 version 1.7.1.

A GetDestinationDetails message can be sent from the ADMF to the network element. A GetDestinationDetails message can be used by the ADMF to retrieve the details of a particular destination. In some embodiments, a GetDestinationDetails message can be defined in accordance with section 6.4.3 of ETSI TS 103 221-1 version 1.7.1.

A GetNEStatus message can be sent from the ADMF to the network element. A GetNEStatus message can be used by the ADMF to determine the status of the network element. In some embodiments, a GetNEStatus message can be defined in accordance with section 6.4.4 of ETSI TS 103 221-1 version 1.7.1.

A GetAllDetails message can be sent from the ADMF to the network element. A GetAllDetails message can be used by the ADMF to determine the details of all tasks and destinations on the network element as well as to determine the status of the network element itself. In some embodiments, a GetAllDetails message can be defined in accordance with section 6.4.5 of ETSI TS 103 221-1 version 1.7.1.

A ListAllDetails message can be sent from the ADMF to the network element. A ListAllDetails message can be used by the ADMF to retrieve a list of XIDs and DIDs on the network element. In some embodiments, a ListAllDetails message can be defined in accordance with section 6.4.6 of ETSI TS 103 221-1 version 1.7.1.

A ReportTaskIssue message can be sent from the network element to the ADMF. A network element can send a ReportTaskIssue request message when the network element becomes aware of an issue (e.g., a warning or a fault) relating specifically to a particular XID. In some embodiments, a ReportTaskIssue message can be defined in accordance with section 6.5.2 of ETSI TS 103 221-1 version 1.7.1.

A ReportDestinationIssue message can be sent from the network element to the ADMF. A network element can send a ReportDestinationIssue request message when the network element becomes aware of an issue (e.g., a warning or a fault) relating specifically to a particular DID. In some embodiments, a ReportDestinationIssue message can be defined in accordance with section 6.5.3 of ETSI TS 103 221-1 version 1.7.1.

A ReportNEIssue message can be sent from the network element to the ADMF. A network element can send a ReportNEIssue request message when the network element becomes aware of an issue (e.g., a warning or a fault) relating to the whole network element. In some embodiments, a ReportNEIssue message can be defined in accordance with section 6.5.4 of ETSI TS 103 221-1 version 1.7.1.

A ping message can be sent either from the network element to the ADMF or vice versa. A ping message can be sent at any time to get a response over the X1 interface. In some embodiments, a ping request message may not include any request parameters. A ping response message may include a field that includes either an OK response or an error message. In some embodiments, a ping message can be defined in accordance with section 6.6.1 of ETSI TS 103 221-1 version 1.7.1.

In some embodiments, the techniques disclosed herein can be utilized in a mobile telecommunications network. Mobile telecommunications networks are widely deployed to provide various communication services such as voice, text messaging, multimedia data, Internet connectivity, and the like. Mobile telecommunications networks can be multiple-access networks capable of supporting multiple users by sharing the available network resources. Mobile telecommunications networks may be referred to herein simply as mobile networks.

There are many different types of mobile devices that can be used in connection with a mobile network. Mobile devices have traditionally included smartphones, tablet computers, and laptop computers, but will increasingly include cars, drones, industrial and agricultural machines, robots, home appliances, medical devices, and so on. In the context of mobile networks, mobile devices are often referred to as user equipment (UE).

A mobile network is distributed over geographical areas that are typically referred to as "cells." Each cell can be served by at least one base station. One or more base stations provide a cell with network coverage, which can be used for transmission of voice, data, and other types of content. When joined together, these cells provide radio coverage over a wide geographic area. In addition, a mobile network is typically connected to the Internet. Thus, a mobile network enables a mobile device to communicate with other mobile devices within the mobile network, as well as other computing devices that are connected to the Internet.

Mobile networks have undergone significant changes over the past several decades. The first two generations of mobile networks supported voice and then text messaging. Third generation (3G) networks initiated the transition to broadband access, supporting data rates typically measured in hundreds of kilobits-per-second. Fourth generation (4G) networks supported data rates that were significantly faster, typically measured in megabits-per-second. Today, the industry is transitioning from 4G to fifth generation (5G) networks, with the promise of significant increases in data rates.

The Third Generation Partnership Project (3GPP) is a consortium of a number of standards organizations that develop protocols for mobile telecommunications. 3GPP is responsible for the development of Long-Term Evolution (LTE) and related 4G standards, including LTE Advanced and LTE Advanced Pro. 3GPP is also responsible for the development of 5G standards. 5G systems are already being deployed and are expected to become widespread in the near future.

3GPP TS 33.127 defines a lawful interception architecture for 5G systems. Among other things, this lawful interception architecture defines how network operators and law enforcement agents can interact. The lawful interception architecture set forth in 3GPP TS 33.127 includes the following aspects: collection where target-related data and content are extracted from the network, mediation where the data is formatted to conform to specific standards, and delivery of the data and content to the law enforcement agency.

Figure 5:
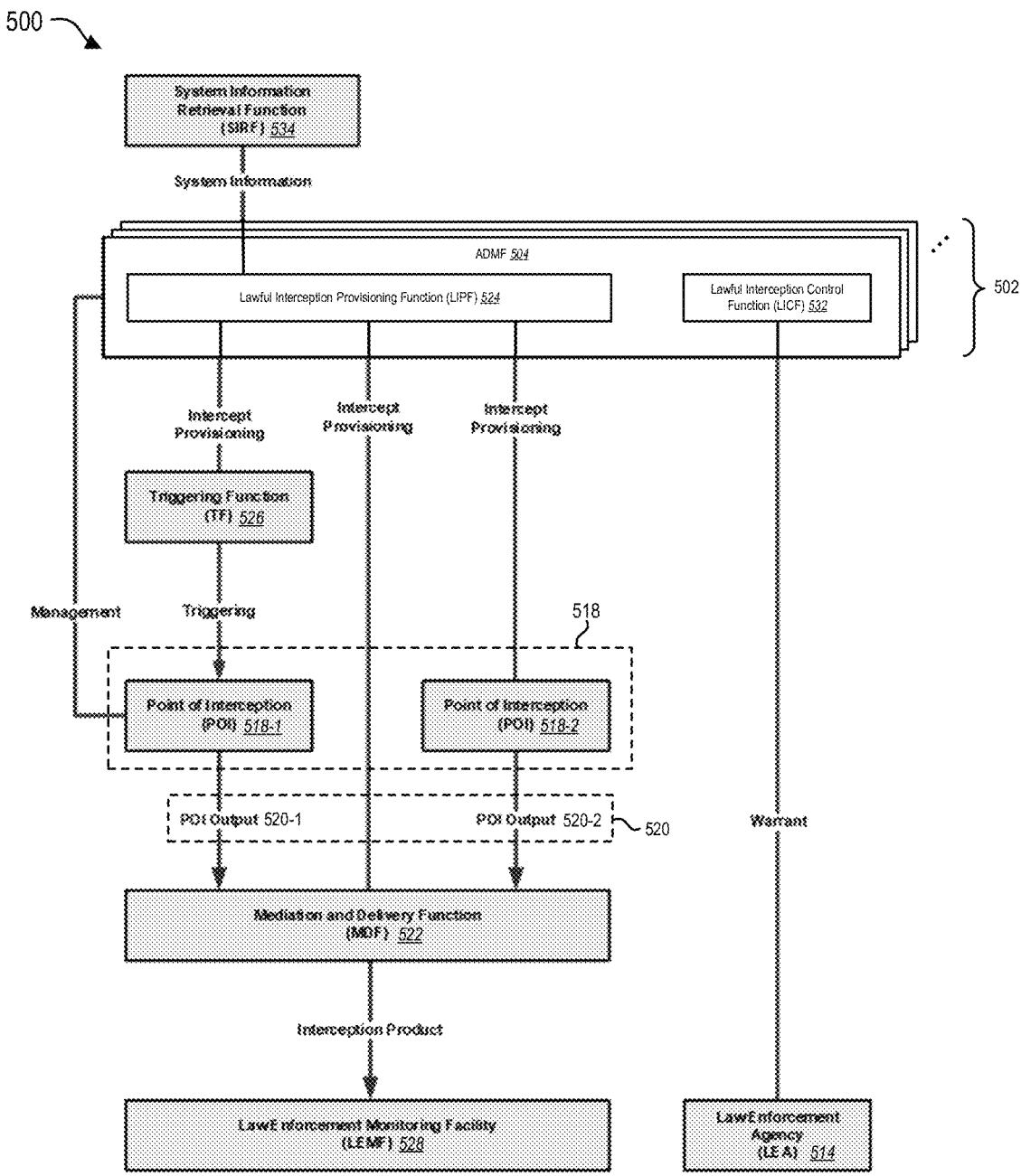
FIG. 5 illustrates an example of a system that includes a lawful interception architecture.

FIG. 5 illustrates an example of a system 500 that includes a lawful interception architecture based on 3GPP TS 33.127. In some embodiments, the techniques disclosed herein can be utilized in the depicted system 500.

A law enforcement agency (LEA) 514 can be responsible for submitting a warrant to a communication service provider (CSP). The warrant can be a formal mechanism to require lawful interception.

A point of interception (POI) 518 detects the target communication(s), derives the intercept related information or communications content from the target communication(s), and delivers the POI output 520 to the mediation and delivery function (MDF) 522. The POI output 520 can be determined by the type of network function associated with the POI 518. A POI 518 can be embedded within a network function or separate from a network function with which it is associated. The lawful interception architecture shown in FIG. 5 shows a first POI 518-1 providing first POI output 520-1 to the MDF 522 and a second POI 518-2 providing second POI output 520-2 to the MDF 522.

POIs 518 can be divided into two categories. Directly provisioned POIs 518 can be provisioned by the lawful interception provisioning function (LIPF) 524. Triggered POIs 518 can be triggered by a triggering function 526. The directly provisioned POIs 518 detect the target's communications that should be intercepted, and then derive the intercept related information or communication contents from that target's communications. The triggered POIs 518 detect the target's communications based on the trigger received from an associated triggering function 526 and then derive the intercept related information or communication contents of the target's communications. In the lawful interception architecture shown in FIG. 5, the first POI 518-1 is triggered by a triggering function 526, and the second POI 518-2 is directly provisioned by the LIPF 524.

The triggering function 526 is provisioned by the LIPF 524 and is responsible for triggering triggered POIs 518 (such as the first POI 518-1 in FIG. 5) in response to network and service events matching the criteria provisioned by the LIPF 524. The triggering function 526 detects the target's communications and sends a trigger to the associated triggered POI 518. As a part of this triggering, the triggering function 526 can provide the triggered POI 518 with various information including interception rules, forwarding rules, and target identity.

The MDF 522 delivers the interception product to the law enforcement monitoring facility (LEMF) 528. The MDF 522 is provisioned by the LIPF 524 with information for providing the interception product to the LEMF 528.

The ADMF 504 can provide the CSP's administrative and management functions for lawful interception capability. This can include overall responsibility for the provisioning/activating, modifying, and de-activating/de-provisioning the POIs 518, triggering functions 526, and the MDFs 522.

A plurality of ADMFs 504 are included in the lawful interception architecture shown in FIG. 5. The plurality of ADMFs 504 can form an ADMF set 502 as described herein. The network elements that interact with the ADMF set 502 can utilize the techniques disclosed herein to identify which of the plurality of ADMFs 504 is the active ADMF 504.

The ADMF 504 can include a lawful interception control function (LICF) 532. The LICF 532 can control the management of the end-to-end lifecycle of a warrant. The LICF 532 can contain a master record of all sensitive information and lawful interception configuration data. The LICF 532 can be responsible for all decisions within the overall lawful interception system. The LICF 532, via the LIPF 524 acting as its proxy, can be responsible for auditing other lawful interception components (e.g., POIs 518, MDFs 522). The LICF 532 can be responsible for communication with administrative systems associated with the LEA 514.

The ADMF 504 can also include a lawful interception provisioning function (LIPF) 524. The LIPF 524 can provision the applicable POIs 518, triggering functions 526, and MDFs 522. The role of the LIPF 524 can vary depending on implementation of network functions and of the ADMF 504 itself.

In some implementations, the LIPF 524 can be a secure proxy used by the LICF 532 to communicate with POIs 518, triggering functions 526, MDFs 522 or other infrastructure involved in operating lawful interception within the CSP's network. In this scenario, the LIPF 524 can be configured so that it does not store target information and simply routes messages from and to the LICF 532.

In some implementations, where the ADMF 504 takes an active role in triggering POIs 518, the LIPF 524 can be responsible for receiving triggering information and forwarding the trigger to the appropriate POI 518.

For directly provisioned POIs 518, triggering functions 526, and MDFs 522, the LIPF 524 can forward lawful interception administration instructions from the LICF 532 to the intended destination POI 518, triggering function 526, or MDF 522.

In some implementations, the LIPF 524 can be responsible for identifying changes to POIs 518, triggering functions 526, and MDFs 522 through interaction with the system information retrieval function (SIRF) 534 or underlying virtualization infrastructure. The LIPF 524 can be configured to notify the LICF 532 of changes affecting the number of active POIs 518 and triggering functions 526 or other information that the LICF 532 uses to maintain the master list of POIs 518, triggering functions 526, and MDFs 522.

The LICF 532 and LIPF 524 can support selective management and provisioning of groups of POIs 518 and triggering functions 526 based on parameters of the warrant (e.g., service scope, target identities), the target UE type and profile (e.g., a smartphone, a CIoT device), and the CSP's network deployment architecture and services implementation, with the purpose of optimizing the lawful interception system operation and avoiding its over-provisioning.

The following are examples of configuration capabilities of the ADMF 504: single or multiple POIs 518 or triggering functions 526 or identify event functions (IEFs); groups of one or more POIs 518, triggering functions 526, and IEFs of a specific parent network function type; POIs 518, triggering functions 526, and IEFs associated with network functions in a specific network slice; POIs 518, triggering functions 526, and IEFs independently where they are contained in the same parent network function; enabling only specific services or features of POIs 518 (individually and in groups). Selective provisioning can be supported on a per warrant basis.

The SIRF 534 can provide the LIPF 524 with the system related information for network functions that are known by the SIRF 534 (e.g., service topology). The information provided can allow the LIPF 524/LICF 532 to perform operations to establish and maintain interception of the target service (e.g., provisioning POIs 518, triggering functions 526, and MDFs 522). LIPF 524/LICF 532 knowledge of POI 518, triggering function 526, and MDF 522 existence can be provided directly by interactions between the LIPF 524/LICF 532 and the underlying CSP management systems that instantiate network functions.

In virtualized networks where selective per POI 518 provisioning of target identifiers is not required, or only limited network static network slicing is in use, implementation of the SIRF 534 is not required to allow the LIPF 524 and LICF 532 to meet lawful interception requirements.

Entities in the lawful interception architecture shown in FIG. 5 that interact with the ADMF 504 are examples of network elements. More specifically, the POI 518, the triggering function 526, the MDF 522, and the SIRF 534 are examples of network elements.

Figure 6:
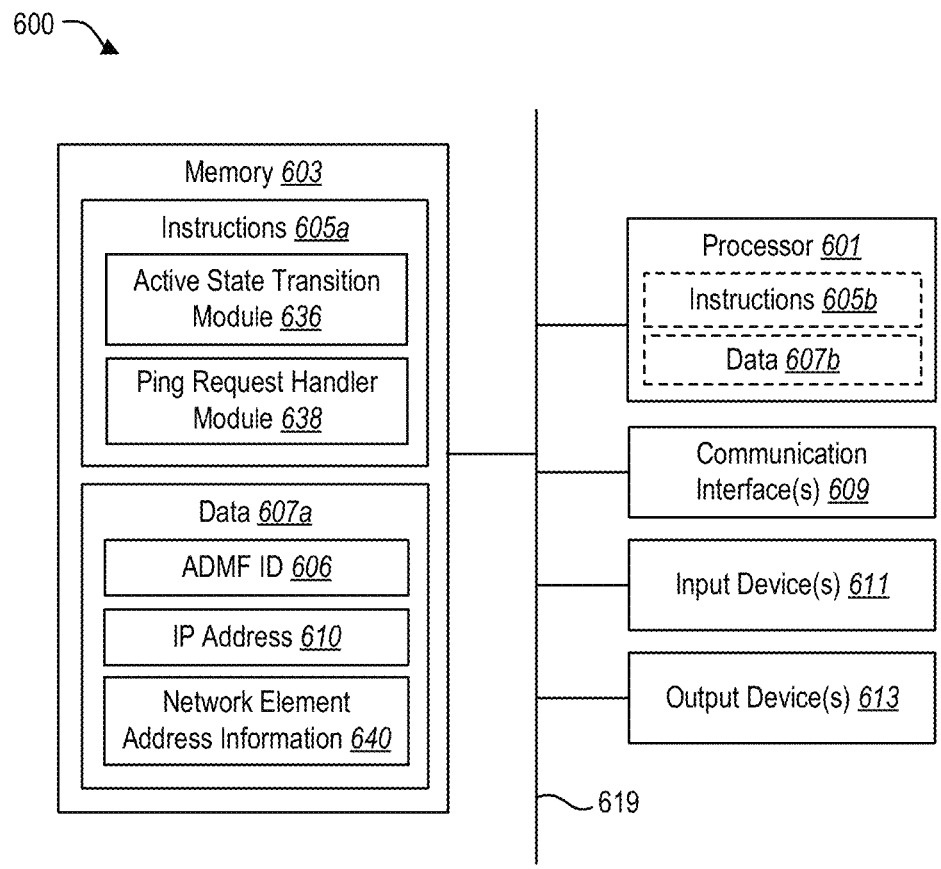
FIG. 6 illustrates certain components that can be included within a computing system that can be used to implement the actions and operations described herein in connection with an ADMF.

FIG. 6 illustrates certain components that can be included within a computing system 600 that can be used to implement the actions and operations described herein in connection with an ADMF. In some embodiments, a plurality of computing systems 600 can collectively implement the actions and operations described herein in connection with an ADMF.

The computing system 600 includes a processor 601 and memory 603 in electronic communication with the processor 601. Instructions 605a and data 607a can be stored in the memory 603. The instructions 605a can be executable by the processor 601 to implement some or all of the methods, steps, operations, actions, or other functionality disclosed herein related to an ADMF. Executing the instructions 605a can involve the use of the data 607a that is stored in the memory 603. When the processor 601 executes the instructions 605a, various instructions 605b can be loaded onto the processor 601, and various pieces of data 607b can be loaded onto the processor 601.

Unless otherwise specified, any of the various examples of modules and components described herein in connection with an ADMF can be implemented, partially or wholly, as instructions 605a stored in memory 603 and executed by the processor 601. Any of the various examples of data described herein in connection with an ADMF can be among the data 607a that is stored in memory 603 and used during execution of the instructions 605a by the processor 601.

Although just a single processor 601 and a single memory 603 are shown in the computing system 600 of FIG. 9, in an alternative configuration, a combination of processors and/or a combination of memory devices could be used.

The instructions 605a in the memory 603 can include one or more modules that can be executable by the processor 601 to perform some or all aspects of the methods that have been described herein in connection with an ADMF. FIG. 6 shows the computing system 600 with an active state transition module 636 and a ping request handler module 638. The active state transition module 636 and the ping request handler module 638 can include instructions 605a that are executable by the processor 601 to perform aspects of the method 200 shown in FIGS. 2A and 2B that involve actions or operations performed by the ADMF 104. The active state transition module 636 and the ping request handler module 638 can also include instructions 605a that are executable by the processor 601 to perform the method 400 shown in FIG. 4.

The data 607a stored in the memory 603 can include any of the various examples of data described herein in connection with an ADMF. The data 607a stored in the memory 603 can represent data that is stored, accessed, or otherwise used in connection with the methods that have been described herein in connection with an ADMF (e.g., the method 200 shown in FIGS. 2A and 2B, the method 400 shown in FIG. 4). For example, the data 607a stored in the memory 603 can include an ADMF ID 606, an IP address 610 for the ADMF, and network element address information 640. The ADMF ID 606 shown in FIG. 6 can represent any of the ADMF IDs described herein (e.g., the ADMF ID 106 shown in FIG. 1). The IP address 610 shown in FIG. 6 can represent any of the ADMF IP addresses described herein (e.g., any of the IP addresses 110 shown in FIG. 1). The network element address information 640 can enable the ADMF to communicate with one or more network elements.

The specific instructions 605a and data 607a shown in FIG. 6 are provided for purposes of example only and should not be interpreted as limiting the scope of the present disclosure. A computing system 600 that implements any of the techniques disclosed herein can include other instructions 605a and/or other data 607a in addition to or instead of what is specifically shown in FIG. 6.

The computing system 600 can also include various other components, including one or more communication interfaces 609, one or more input devices 611, and one or more output devices 613.

The communication interface(s) 609 can be configured to communicate with other computing systems and/or networking devices. This includes receiving data transmissions from other computing systems and/or networking devices, and also sending data transmissions to other computing systems and/or networking devices. The communication interface(s) 609 can be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The various components of the computing system 600 can be coupled together by one or more buses, which can include a power bus, a control signal bus, a status signal bus, a data bus, etc. For simplicity, the various buses are illustrated in FIG. 9 as a bus system 619.

Figure 7:
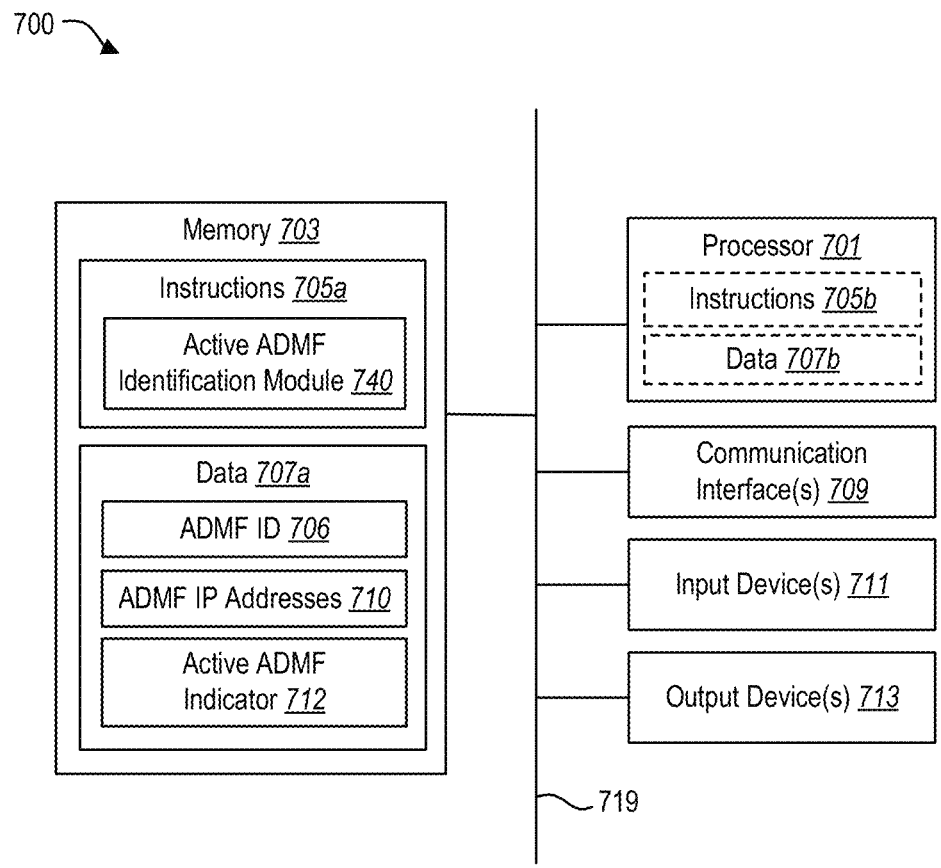
FIG. 7 illustrates certain components that can be included within a computing system that can be used to implement the actions and operations described herein in connection with a network element.

FIG. 7 illustrates certain components that can be included within a computing system 700 that can be used to implement the actions and operations described herein in connection with a network element. In some embodiments, a plurality of computing systems 700 can collectively implement the actions and operations described herein in connection with a network element.

The computing system 700 is similar in several respects to the computing system 600 described previously in connection with FIG. 6. The computing system 700 includes a processor 701 and memory 703 in electronic communication with the processor 701. Instructions 705a and data 707a can be stored in the memory 703. The computing system 700 can also include one or more communication interfaces 709, one or more input devices 711, and one or more output devices 713. The various components of the computing system 700 can be coupled together by a bus system 719. These components can be similar to the components described previously.

The instructions 705a can be executable by the processor 701 to implement some or all of the methods, steps, operations, actions, or other functionality disclosed herein related to a network element. Unless otherwise specified, any of the various examples of modules and components described herein in connection with a network element can be implemented, partially or wholly, as instructions 705a stored in memory 703 and executed by the processor 701. Any of the various examples of data described herein in connection with a network element can be among the data 707a that is stored in memory 703 and used during execution of the instructions 705a by the processor 701.

The instructions 705a in the memory 703 can include one or more modules that can be executable by the processor 701 to perform some or all aspects of the methods that have been described herein in connection with a network element. FIG. 7 shows the computing system 700 with an active ADMF identification module 740. The active ADMF identification module 740 can include instructions 705a that are executable by the processor 701 to perform aspects of the method 200 shown in FIGS. 2A and 2B that involve actions or operations performed by the network element. The active ADMF identification module 740 can also include instructions 705a that are executable by the processor 701 to perform the method 300 shown in FIG. 3.

The data 707a stored in the memory 703 can include any of the various examples of data described herein in connection with a network element. The data 707a stored in the memory 703 can represent data that is stored, accessed, or otherwise used in connection with the methods that have been described herein in connection with a network element (e.g., the method 200 shown in FIGS. 2A and 2B, the method 300 shown in FIG. 3). For example, the data 707a stored in the memory 703 can include an ADMF ID 706, ADMF IP addresses 710, and an active ADMF indicator 712. The ADMF ID 706 shown in FIG. 7 can represent any of the ADMF IDs described herein (e.g., the ADMF ID 106 shown in FIG. 1). The ADMF IP addresses 710 can represent any of the ADMF IP addresses described herein (e.g., the IP addresses 110 shown in FIG. 1). The active ADMF indicator 712 can represent any of the active ADMF indicators described herein (e.g., the active ADMF indicator 112 shown in FIG. 1).

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for identifying an active administration function (ADMF) in a lawful interception deployment, the method being implemented by a network element, the method comprising:

identifying a plurality of ADMFs in an ADMF set, wherein each ADMF of the ADMF set is associated with a same identifier, and wherein one ADMF of the ADMF set is an active ADMF for the ADMF set at a given time;

receiving an auditing request message from one of the plurality of ADMFs in the ADMF set, wherein the auditing request message does not identify a specific ADMF in the ADMF set as a sender of the auditing request message;

sending a ping request message to each ADMF in the ADMF set;

receiving a ping response message from a first ADMF among the plurality of ADMFs in the ADMF set;

identifying the first ADMF as the active ADMF based on receiving the ping response message from the first ADMF; and exchanging lawful interception signaling with the first ADMF based on the first ADMF being identified as the active ADMF.

2. The method of claim 1, the plurality of ADMFs in the ADMF set being configured to ensure provisioning of an intercept request associated with delivering interception-related information to the network element.

3. The method of claim 1, wherein:
the plurality of ADMFs in the ADMF set are associated with an ADMF identifier;
each ADMF in the ADMF set also comprises an Internet protocol (IP) address; and
the method further comprises configuring the network element with the ADMF identifier and the IP address of each ADMF in the ADMF set.

4. The method of claim 1, wherein the network element does not receive any other ping response messages from any other ADMFs among the plurality of ADMFs in response to sending the ping request message.

5. The method of claim 1, wherein the network element is selected from the group consisting of a point of interception, a triggering function, a mediation and delivery function, and a system information retrieval function.

6. The method of claim 1, wherein the network element is a network function in a fifth generation (5G) network.

7. The method of claim 1, wherein the plurality of ADMFs includes at least one ADMF that remains in a standby state so long as the first ADMF is designated as the active ADMF.

8. A system, comprising:
at least one processor;
a memory in electronic communication with the at least one processor; and
instructions stored in the memory, the instructions being executable by the at least one processor to:
identify a plurality of active administration functions (ADMFs) in an ADMF set, wherein each ADMF of the ADMF set is associated with a same identifier, and wherein one ADMF of the ADMF set is an active ADMF for the ADMF set at a given time;
receiving an auditing request message from one of the plurality of ADMFs in the ADMF set, wherein the auditing request message does not identify a specific ADMF in the ADMF set as a sender of the auditing request message;
sending a ping request message to each ADMF in the ADMF set;
receiving a ping response message from a first ADMF among the plurality of ADMFs in the ADMF set;

identifying the first ADMF as the active ADMF based on receiving the ping response message from the first ADMF; and exchanging lawful interception signaling with the first ADMF based on the first ADMF being identified as the active ADMF.

9. The system of claim 8, the plurality of ADMFs in the ADMF set being configured to ensure provisioning of an intercept request associated with delivering interception-related information to the network element.

10. The system of claim 8, wherein:

the plurality of ADMFs in the ADMF set are associated with an ADMF identifier;

each ADMF in the ADMF set also comprises an Internet protocol (IP) address; and the method further comprises configuring the network element with the ADMF identifier and the IP address of each ADMF in the ADMF set.

11. The system of claim 8, wherein the network element does not receive any other ping response messages from any other ADMFs among the plurality of ADMFs in response to sending the ping request message.

12. The system of claim 8, wherein the network element is selected from the group consisting of a point of interception, a triggering function, a mediation and delivery function, and a system information retrieval function.

13. The system of claim 8, wherein the network element is a network function in a fifth generation (5G) network.

14. The system of claim 8, wherein the plurality of ADMFs includes at least one ADMF that remains in a standby state so long as the first ADMF is designated as the active ADMF.

15. In a fifth generation (5G) network environment including active administration functions (ADMFs), a method being implemented by a network element, the method comprising:

identifying a plurality of ADMFs in an ADMF set;

receiving an auditing request message from one of the plurality of ADMFs in the ADMF set, wherein the auditing request message does not identify a specific ADMF in the ADMF set as a sender of the auditing request message;

sending a ping request message to each ADMF in the ADMF set;

receiving a ping response message from a first ADMF among the plurality of ADMFs in the ADMF set;

identifying the first ADMF as the active ADMF based on receiving the ping response message from the first ADMF; and exchanging lawful interception signaling with the first ADMF based on the first ADMF being identified as the active ADMF.

16. The method of claim 15, wherein at any given point in time one ADMF among the plurality of ADMFs is identified as an active ADMF.

17. The method of claim 15, wherein the network element is selected from the group consisting of a point of interception, a triggering function, a mediation and delivery function, and a system information retrieval function.

18. The method of claim 15, wherein the plurality of ADMFs includes one or more ADMFs that remains in a standby state so long as the first ADMF is designated as the active ADMF.

* * * * *